United States Patent
O'Brien et al.

(10) Patent No.: US 7,351,001 B1
(45) Date of Patent: Apr. 1, 2008

(54) PILLAR SHIELD FOR SECURING A WIRE HARNESS

(75) Inventors: Joseph T. O'Brien, Canton, MI (US); Brian L. Wagner, Ypsilanti, MI (US)

(73) Assignee: Yazaki North America, Inc., Canton, MI (US)

( * ) Notice: Subject to any disclaimer, the term of this patent is extended or adjusted under 35 U.S.C. 154(b) by 624 days.

(21) Appl. No.: 10/621,629

(22) Filed: Jul. 17, 2003

(51) Int. Cl.
*F16B 21/08* (2006.01)
*B23P 19/00* (2006.01)

(52) U.S. Cl. ............ 403/397; 403/329; 403/DIG. 14; 29/739; 29/748

(58) Field of Classification Search ............ 403/329, 403/397, 408.1, DIG. 14; 292/DIG. 38; 248/56, 71; 24/289–292; 29/453, 729, 739 X, 29/748 X, 832
See application file for complete search history.

(56) References Cited

U.S. PATENT DOCUMENTS

| | | | |
|---|---|---|---|
| 3,967,050 A * | 6/1976 | Makihara et al. .............. 248/56 |
| 4,356,601 A | 11/1982 | Kimura |
| 4,379,648 A * | 4/1983 | Tanaka et al. ....... 403/DIG. 14 |
| 4,485,282 A * | 11/1984 | Lee |
| 4,488,206 A * | 12/1984 | Mizusawa ............ 403/DIG. 14 |
| 4,629,356 A * | 12/1986 | Hayashi .................... 403/408.1 |
| 4,755,109 A * | 7/1988 | Botts ............................ 29/453 |
| 5,039,040 A * | 8/1991 | Idjakiren ..................... 248/71 |
| 5,149,027 A | 9/1992 | Weber |
| 5,291,639 A * | 3/1994 | Baum et al. .................. 24/289 |
| 5,358,291 A * | 10/1994 | Malmanger et al. . 292/DIG. 38 |
| 5,505,103 A * | 4/1996 | Nordstrom et al. ......... 403/329 |
| 5,592,720 A | 1/1997 | Sasakawa et al. |
| 5,615,584 A * | 4/1997 | Irish ............................ 248/56 |
| 5,816,733 A * | 10/1998 | Ishikawa et al. ............ 403/329 |
| 5,868,362 A * | 2/1999 | Daoud ......................... 248/71 |
| 6,116,807 A * | 9/2000 | Dzurko et al. .............. 403/329 |
| 6,305,725 B1 * | 10/2001 | Antonucci et al. |
| 6,409,256 B1 | 6/2002 | Page |

FOREIGN PATENT DOCUMENTS

JP 9109794 4/1997

\* cited by examiner

*Primary Examiner*—Daniel P. Stodola
*Assistant Examiner*—Victor MacArthur
(74) *Attorney, Agent, or Firm*—Rader, Fishman & Grauer PLLC

(57) ABSTRACT

A plug for enclosing an opening within a wall of a hollow pillar and securing a wire harness running within the pillar. Included are at least two locks that resiliently engage the edge of the opening in order to secure the plug within the opening and align the plug within the opening along a first axis. Also included are at least two tensioners that resiliently engage the edge of the opening and align the plug within the opening along a second axis. At least one stabilizer then resiliently engages the wall, thereby exerting tension within the plug along a third axis.

1 Claim, 2 Drawing Sheets

PILLAR SHIELD FOR SECURING A WIRE HARNESS

FIELD OF THE INVENTION

The present invention relates to a new device and method for securing a wire harness. More particularly, the present invention relates to a plug, such as a pillar shield for an automobile, for securing a wire harness running through a hollow structure such as a post or pillar.

BACKGROUND OF THE INVENTION

Virtually all types of vehicles, such as, for example, an automobile, have numerous conductors or wires running throughout the vehicle. These wires distribute power to various electrical components of the vehicle and allow for components or devices of the vehicle to communicate with one another. These wires are often grouped together into a bundle to form a wire harness, and are frequently concealed by running them within the frame of the vehicle. For instance, a wire harness may run through one or more pillars of an automobile in order to connect the electrical devices located in the rear or ceiling of the vehicle to the primary power supply and electronics contained in the front of the vehicle.

In order to provide access to a wire harness that runs within a pillar of an automobile, an opening is often provided within one of the walls making up the pillar. During assembly of the vehicle, a type of plug or clip, often referred to as a pillar shield within the industry, is used to close off the opening, as well as secure the wire harness to prevent it from moving within the pillar. One example of this arrangement is illustrated in FIG. 1, which depicts a wire harness 130 running within a vehicle pillar 100 having an outer wall 120 and inner wall 110. Provided within the inner wall 110 is an opening 140 into the interior of pillar 100. Defining the opening 140 is a portion of the wall 110 that forms a flange or edge 150 of the opening 140. Also illustrated is a typical pillar shield 200 which is used to close off the opening 140 and secure the wire harness 130. According to the example illustrated in FIG. 1, the wire harness 130 is secured to the pillar shield 200 by means of a fastening device 252 that encircles the wire harness 130 and then attaches to the pillar shield 200.

Illustrated in greater detail in FIG. 2 is the typical pillar shield 200 depicted in FIG. 1. Located at one end of the pillar shield 200 is a fixed recess or slot 220 designed to fit over the edge 150 of the opening 140. At the other end of pillar shield 200 are clips 210 that resiliently engage the edge 150 of opening 140 and lock the pillar shield 200 within the opening 140. A pair of fixed guide walls 230, designed to abut up against the edge 150 of the opening 140, are provided to prevent the pillar shield from moving back and forth within the opening 140. A wire harness 130 is then secured to the shield 200 by means of either a clip 240, or a fastening device 252, as illustrated in FIG. 1, that plugs into a receiving hole 250. The wire harness may run completely within the pillar 100 as illustrated or may transition from outside of the inner wall 110 into the pillar.

Several complications arise, however, with the use of a typical pillar shield 200 as illustrated in FIG. 2. Installation of the pillar shield 200 can be difficult as the shield 200 obscures the flange edge 150 of the opening 140 during the installation process. As a result, alignment of the shield 200 with respect to the opening 140 frequently becomes a trial and error process. Achieving and maintaining an alignment of the shield subsequent to its insertion into the opening 140 is also difficult due to variances in the size of opening 140. Specifically, shield 200 is designed for a specific size opening. However, because of tolerances in the production process, the dimensions of opening 140 will vary to a certain extent. As a result, shield 200 is frequently out of alignment within the opening with respect to a first axis, i.e., X-axis, and a second axis, i.e. Y-axis.

Furthermore, the typical pillar shield 200, as illustrated in FIG. 2, often fails to mount within the opening 140 in a secure enough manner to prevent movement of the shield 200. This is especially important in a vehicle environment, such as an automobile, which is frequently subject to repeated bumps, jolts and vibrations that lead to the shield 200 moving back and forth within the opening 140 either along a plane parallel to the wall 110 containing the opening 140, or along a plane perpendicular to the wall 110.

Consequently, the inventors of the present invention recognized a need for a pillar shield that securely mounts within an opening and secures a wire harness. Further recognized was the need for a pillar shield that could be easily aligned within the opening during its installation, and which subsequently maintained a proper alignment.

SUMMARY OF THE INVENTION

The present invention relates to a device and method for enclosing an opening within a wall of a hollow pillar and securing a wire harness running through the pillar. According to an embodiment of the invention, the device comprises a type of plug that includes at least two locks that resiliently engage the edge of the opening in order to secure the plug within the opening and align the plug within the opening along a first axis. Also included are at least two tensioners that resiliently engage the edge of the opening and align the plug within the opening along a second axis. At least one stabilizer is also provided that resiliently engages the wall, thereby exerting tension within the plug along a third axis.

DETAILED DESCRIPTION

Figure 1:
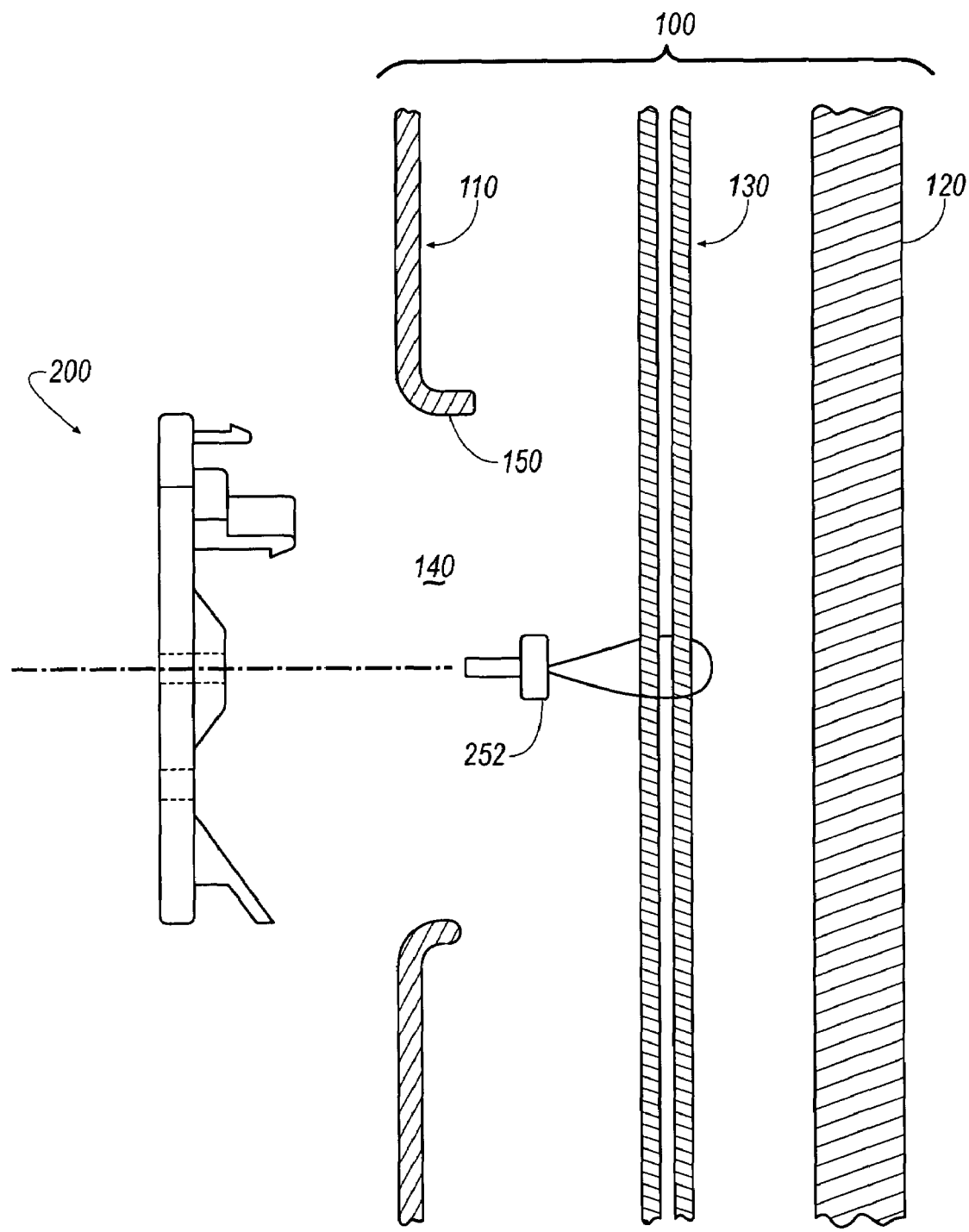
FIG. 1 is a simplified illustration of a typical pillar shield and its relation to an automobile pillar containing a wire harness.
Figure 2:
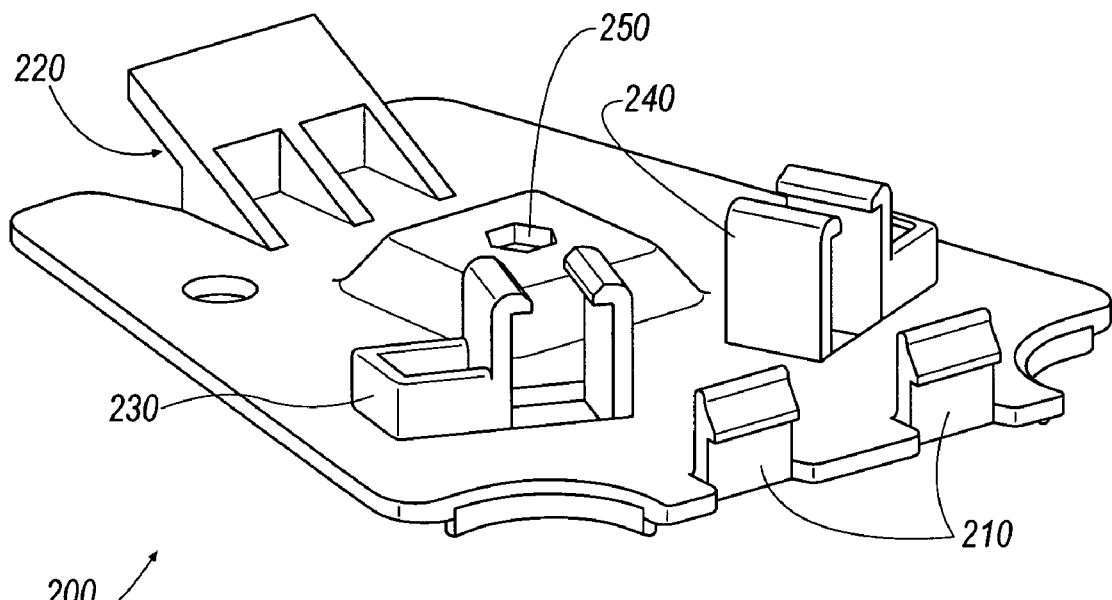
FIG. 2 illustrates a typical pillar shield.
Figure 3:
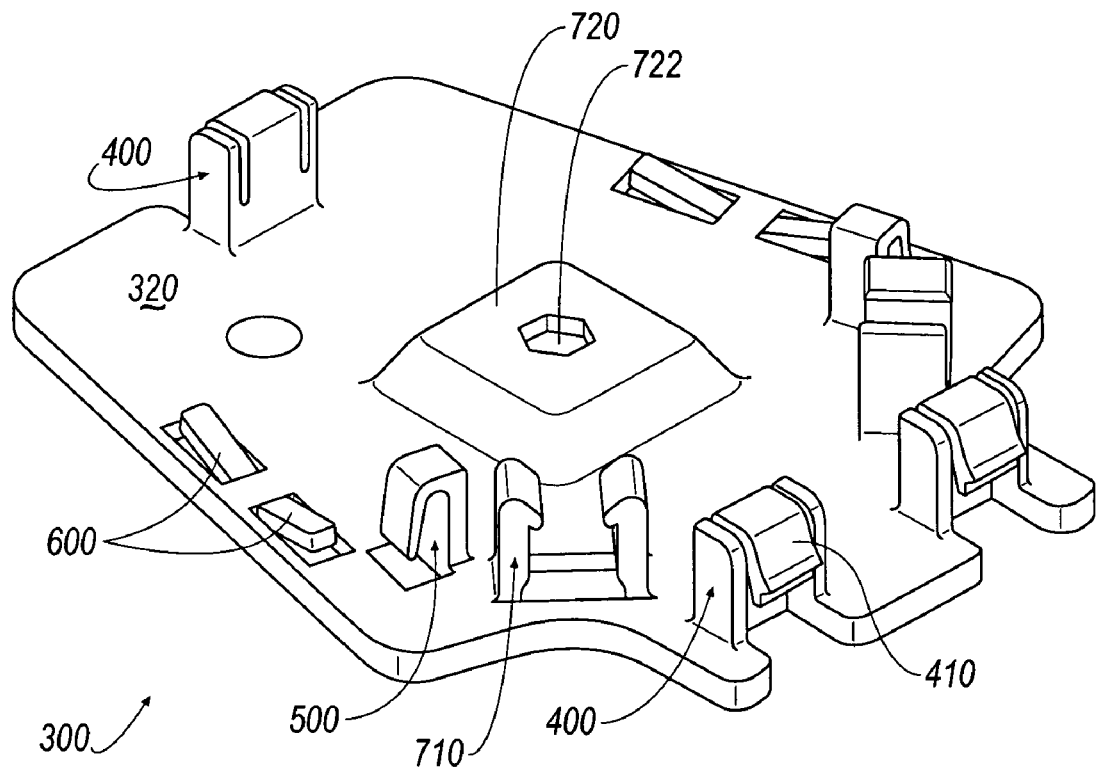
FIG. 3 illustrates a pillar shield in accordance with an exemplary embodiment of the present invention.

The present invention, according to a first exemplary embodiment, will now be discussed in reference to FIG. 3. In addition, certain elements of FIG. 1 that are part of pillar 100 will also be referred to in order to facilitate the description of the invention. Illustrated in FIG. 3 is a plug or pillar shield 300 for insertion into and enclosing off an opening within a wall, as well as securing one or more wires or conductors running on the opposite side of the wall. According to the present embodiment, the pillar shield 300 is a one-piece monolithic structure comprised of, for example, an elastic polymer. However, according to an alternative embodiment, the shield 300 could be constructed from multiple structures that are subsequently joined by any one or more different bonding processes.

Pillar shield 300 includes, among other things, a base 320 that is generally planar in shape. Projecting out from the base 320 are at least two clips or locks 400 (hereafter simply referred to as locks) that resiliently engage the edge 150 of opening 140 and secure the shield 300 within the opening 140. In some cases, the locks 400 are generally book shaped leaf springs. At least one of the locks 400 is located at one end of the shield 300, while at least one other of the locks 400 is located at the opposite end of the shield 300. In the embodiment depicted in FIG. 3, two locks 400 are located at one end of the shield 300 while a single lock 400 is located at the opposite end of the shield 300. Each of the locks 400 includes a head or end portion 410 that is generally rounded or arcuate in shape, which, as will be discussed below, assists in alignment of the shield.

Also projecting out from the base 320 of shield 300 are two or more tensioners 500 that resiliently engage the edge 150 of opening 140 when the shield 300 is inserted into and encloses the opening 140. In some cases, the tensioners 500 are generally hook shaped leaf springs. At least one tensioner 500 is located along one side of the base 320 or edge of the shield 300, while at least one other of the tensioners 500 is located along the opposite side of the base 300. According to the embodiment illustrated in FIG. 3, a first tensioner 500 is located along a first side of the base 320, while a second tensioner 500 is located along a second side of the base 320 directly opposite from the first tensioner 500. Alternatively, the two tensioners 500 need not be located directly opposite each other, although, as will become apparent from the discussion below, this alternate configuration could lead to difficulties with alignment of the shield 300.

Similar to the placement of the locks 400, two tensioners 500 could also be placed along one side of base 320 while a single tensioner 500 is placed along the opposite side of base 320. In this configuration, the single tensioner 500 would ideally be located along the side at a point that is equally distant from the two tensioners 500 along the opposite side, thereby allowing for a balance of forces generated by the tensioners 500. According to another alternative embodiment, two or more tensioners 500 could be located along each side of the shield 300. The use of multiple tensioners 500 along each side provides for greater discretion in the placement of the tensioners 500 while still maintaining alignment of shield 300. Similar to the locks 400, each of the tensioners 500 have an exposed top surface or end portion that is generally rounded or arcuate in shape.

Also located along each side of base 320 is a stabilizer 600 that resiliently engages the wall 110 when the shield 300 is secured in the opening 140. In some cases, stabilizer 600 is a generally tab shaped leaf spring. In the embodiment illustrated in FIG. 3, each stabilizer 600 comprises a pair of protrusions that extend out from the base 320 in a manner such that they tend to "push" shield 300 away from the wall 110 while any forces they generate that run parallel to the base 320 are cancelled out by one another. According to an alternative embodiment, each stabilizer 600 could comprise a single protrusion that extends out from the base 320 of shield 300. However, in this alternative embodiment, the single protrusion would generate an amount of force running parallel to the base 320 that could possibly hinder the alignment process of shield 300 to a certain degree that may or may not be acceptable to the automotive manufacturer. According to another alternative embodiment, more than one stabilizer 600 could be placed along each side of shield 300.

Also present on shield 300 are one or more fasteners for securing a wire harness, whether the wire harness transitions from outside the pillar into the pillar or is fastened completely within the pillar. In the illustrated embodiment of FIG. 3, two types of fasteners are provided. The first type of fastener comprises one or more clips 710 that project out from the base 320 and secures a wire harness that is placed down into the clip 710. Alternatively, a wire harness can be secured to the shield 300 through use of a separate component, such as, for example, a clip or loop that secures the wire harness and then attaches to the shield 300. For receiving the clip or loop that is secured to the wire harness, shield 300 includes a raised platform 720 having an opening 722 located in the center of the platform 720. After being secured to the wire harness, the separate clip or loop attaches to the shield 300 by inserting a portion of the clip or loop through the opening 722.

Application of the shield 300 to enclose the opening 140 and secure a wire harness 130 will now be described. As the shield 300 is brought into close proximity of the opening 140, the end portions of the locks 400 and tensioners 500 come into contact with the flanged edges 150 that define the opening 140. Due to the end portions being generally rounded or arcuate in shape, the shield 300 tends to slide or move into an initial proper alignment with respect to the opening 140.

As further force is applied to position the shield 300 within the opening 140, both the locks 400 and tensioners 500 resiliently engage the edge 150 of opening 140. At a predetermined depth through the opening, locks 400 engage the edge 150 in such a manner that the shield 300 becomes "locked" into place and cannot be readily withdrawn from the opening 140. While in this state, each of the resilient locks 400 are compressed up against the edge 150. As a result of being compressed up against the edge 150, each of the locks 400 generates a force that tends to push shield 300 away from the portion of the edge 150 that engages the lock. As there is at least one lock 400 located at each end of the shield 300, opposing forces are generated. These opposing forces generated by the compressed locks 400 tend to counteract each other, causing shield 300 to align within the opening 140 along a first axis, e.g., Y-axis, that is generally parallel with the wall 110.

Upon resiliently engaging the edge 150 of opening 140, tensioners 500 also become compressed up against the edge 150. Upon being compressed, each of the tensioners 500 generates a force that tends to push shield 300 away from the portion of the edge 150 that engages the tensioner 500. As one or more tensioners 500 is placed along both of the two opposing sides of base 320, the forces generated by tensioners 500 tend to counteract each other. As a result of these opposing forces, shield 300 tends to align within the opening 140 along a second axis, e.g., X-axis, which is also generally parallel with the wall 110.

As shield 300 is inserted into opening 140, stabilizers 600 resiliently engage a portion of the wall 110 surrounding opening 140. The stabilizers 600 subsequently become compressed up against the wall 110 as shield 300 is locked within the opening 140. As a result of being compressed, the resilient stabilizers 600 generate an overall force that tends to push the shield 300 away from the wall 110. However, shield 300 remains engaged within the opening 140 due to locks 400.

Depending on the type of access that is available to the interior of the pillar or pole 100, it may be desirable to secure the wire harness 130 to the shield 300 before the shield 300 is locked within the opening 140. Alternatively, if other means of accessing the interior of pillar 100 exists, wire harness 130 can be secured to shield 300 after the shield 300 is positioned within the opening 140. As discussed above, the wire harness 130 is secured to the shield 300 by a fastener. According to the exemplary embodiment illustrated in FIG. 3, the fastener can be either a clip 710, or alternatively, a separate component that is first secured to the wire harness 130 and then attached to the shield 300 by insertion into opening 722. However, the fastener is not limited to these specific embodiments, which are presented simply for demonstration purposes, but instead can be any one or more of a variety of types of fasteners, such as, for example, a clip, hook, latch, plug, or adhesive to name just a few.

Through the use of locks 400 that resiliently engage the edge 150 of opening 140, shield 300 automatically aligns within the opening along a first axis, regardless of variances in the size of the opening due to accepted tolerances in the manufacturing process. Similarly, shield 300 automatically aligns within the opening along a second axis due to the use of tensioners 500 that also resiliently engage edge 150 of opening 140. According to the embodiment illustrated in FIG. 3, the first and second axes are roughly perpendicular to one another. However, the relationship between the first and second axes is not limited to this example, but instead is dependent only on the general shape of the pillar shield 300.

In contrast to the locks 400 and tensioners 500, stabilizers 600 secure the shield 300 along a third axis that lies perpendicular to the first and second axes. The resultant tension created by stabilizers 600 helps prevent movement of the shield 300 within the opening 140, thereby further minimizing the chances that the wire harness should detach from the shield 300, or that the shield generate noise due to "rattling" and the like.

According to a further embodiment of the present invention, shield 300 may not comprise all three types of securing means, including the locks 400, tensioners 500 and stabilizers 600. Instead, shield 300 may be constructed so as to include only one or two of the types of securing means listed above. Thus, for example, a shield 300 may only include the use of locks 400 and stabilizers 600, forgoing the use of the tensioners 500. Alternatively, for example, shield 300 may include the use of locks 400 and tensioners 500, but not the use of stabilizers 600.

While the invention has been specifically described in connection with certain specific embodiments thereof, it is to be understood that this is by way of illustration and not of limitation, and the scope of the appended claims should be construed as broadly as the prior art will permit.

What is claimed is:

1. A plug inserted into and enclosing an opening within a wall of a hollow post and securing a wire harness running within said hollow post, comprising:

at least two locks projecting out from a surface of said plug and securing said plug within the opening, at least one of said locks being located at or near a first end of said plug, and at least one of said locks being located at or near a second end of said plug, said locks resiliently engaging an edge of the opening and aligning said plug within the opening along a first axis;

at least two tensioners projecting out from said surface of said plug and resiliently engaging the edge of the opening and aligning said plug within the opening along a second axis, at least one of said tensioners being located at or near a first edge of said plug, and at least one of said resilient tensioners being located at or near a second edge of said plug;

at least one stabilizer projecting out from said surface of said plug and resiliently engaging the wall, thereby exerting tension within the plug along a third axis; and at least one fastener for securing the wire harness to said plug;

wherein the at least two tensioners and two of the at least two locks are hook shaped leaf springs;

wherein the at least one stabilizer includes at least two tab shaped leaf springs extending in substantially opposite directions from one another.

* * * * *